No. 763,130. Patented June 21, 1904.

UNITED STATES PATENT OFFICE.

PAUL WALTHER, OF CHICAGO, ILLINOIS.

COMPOSITION FOR ARTIFICIAL STONE.

SPECIFICATION forming part of Letters Patent No. 763,130, dated June 21, 1904.

Application filed September 5, 1903. Serial No. 172,037. (Specimens.)

*To all whom it may concern:*

Be it known that I, PAUL WALTHER, a citizen of the United States, residing at No. 406 West Chicago avenue, in the city of Chicago, county of Cook, and State of Illinois, have invented a new and useful Composition for Pavements, Floors, Steps, and all other Purposes to which Artificial Stone Can be Applied or Used, of which the following is a specification.

The objects of my invention are to provide a composition specially adapted for paving, flooring, and other artificial-stone construction which can be, first, more economically produced than asphalt or any other material hitherto used for the same purposes; second, which exceeds all other paving and flooring composition in strength and durability; third, which is not liable to disintegrate by exposure to extreme temperatures; fourth, that is impervious to moisture; fifth, which atmospheric heat or cold will neither soften nor harden nor crack; sixth, which will not crumble or scale; seventh, which will connect with and adhere to other stone and materials, and, eighth, which can be colored, dressed, and polished.

My invention consists in the combination, first, of a certain chemical compound formed by pressure into a solid mass; second, in the reduction of this solid compound by water to a fluid; third, the dry mixture of magnesite and sand and other materials hereinafter described, and the final mixture of this dry mixture with the chemical fluid into a plastic mass ready for immediate use.

In carrying out my invention I mix two parts, by volume, of magnesium bromid, one part of salts of sodium, one part of potassium sulfate, and from three-fourths of one part, by volume, to one and a quarter parts of muriate of aluminium all together and press it into a solid mass which may be broken up in suitable parts for handling and transportation. This mass in its solid state has an acidity of from 90° to 100°, as per the lye-gage. In this state the solid chemical compound is conveyed to the place where the pavement or other structure is to be produced. There I dissolve it in water at from 70° to 90° Fahrenheit, adding sufficient water to reduce the acidity of this fluid compound to from 22° to 30°, as per lye-gage. I then prepare a dry mixture of one part of magnesite to from two to six parts of sand. Into this dry mixture I pour my prepared fluid compound and mix it all thoroughly till I have a soft plastic mass, which I can esasily spread over any surface or mold into any shape. After being spread, applied, or molded my composition will dry in from eight to twelve hours and form an impervious stone ready for dressing or polishing or immediate use.

When I prepare my composition for pavements, the sand used is coarse gravelly sand. When prepared for stairways, window-sills, and similar structures, I use a finer sand. When prepared for floors and to be laid on wood foundations, I reduce the proportional quantity of sand one-half and add one-half sawdust to the sand, making the mixture of sawdust and sand the same—to wit, one part of magnesite with a mixture in equal proportions of from two to six parts of sand and sawdust. When my composition is prepared for particularly hard surfaces, I use iron borings instead of sawdust, and for the finest floors, such as bowling-alleys, I add chopped paper. I use from two to four parts of fine granite for hard stone, from two to four parts of screening of all kinds of stone for tiling and paving. This compound used with Illinois steel cement improves the cement.

In addition to the above binders the following are found to give good results when used with the compound of this invention: One part of magnesite with two to six parts of colored marble-dust gives a fine imitation marble. The addition of mable-chips gives a good floor-tiling; two to six parts of volcanic sand to one part of mangesite for fire-bricks. Two to six parts of asbestos gives a fire-resisting and insulating compound, two to six parts of sand and cinders for floors, fine cinders for fire-lining, fine ashes for walks and wainscoting, and ashes and sand for walks. Used with sawdust alone it gives a fine fireproof tiling which will not crack under excessive heat when brought into contact with water.

I am aware that a patent has been issued employing magnesia as one of its elements.

I do not claim the use of magnesia, but magnesite, and have found from repeated experiments that magnesia is an entirely-different substance, which fails to give any satisfactory results whatever when used in this connection.

What I claim, and desire to secure by Letters Patent, is—

1. A compound for street and other pavements, composed of the combination of a chemical fluid containing and consisting of, by volume, magnesium bromid, two parts; salts of sodium, one part; potassium sulfate, one part; muriate of aluminium from three-fourths to five-fourths ($\frac{3}{4}$ to $\frac{5}{4}$) parts reduced to a solid mass by pressure, said mass having an acidity of from $90°$ to $100°$, as per lye-gage, and a sufficient quantity of water to dissolve this solid mass, and reduce the acidity of the resultant chemical fluid to from $22°$ to $30°$, as per lye-gage, with a combination consisting of one part of magnesite and from two to four parts of gravelly sand, mixed together dry; this chemical fluid and mineral mixture being combined into one soft, plastic composition, substantially as described and for the purposes specified.

2. The herein-described composition of matter consisting of a fluid mixture of magnesium bromid, salts of sodium, potassium sulfate, muriate of aluminium and water, and a mixture of magnesite, and fine sand, the whole mixture formed into a soft, plastic mass, substantially as described and for the purposes specified.

3. The herein-described composition of matter consisting of a fluid mixture of magnesium bromid, salts of sodium, potassium sulfate, muriate of aluminium and water, and a mixture of magnesite, sand and sawdust, the whole united and formed into a plastic mass, substantially as described and for the purposes specified.

4. The herein-described composition of matter consisting of a fluid mixture of magnesium bromid, salts of sodium, potassium sulfate, muriate of aluminium and water, and a mixture of magnesite, sand and iron borings, the whole united in a soft, plastic mass, substantially as described and for the purposes specified.

5. The herein-described composition of matter consisting of a fluid mixture of magnesium bromid, salts of sodium, potassium sulfate, muriate of aluminium and water, and a mixture of magnesite, and a suitable filler the whole formed into a soft plastic mass, substantially as described and for the purposes specified.

6. The herein-described composition of matter consisting of a mixture of magnesium bromid, salts of sodium, potassium sulfate, muriate of aluminium and water, and a mixture of magnesite, and a suitable filler the whole united in one soft plastic mass, substantially as described and for the purposes specified.

PAUL WALTHER.

Witnesses:
  Oscar W. Bond,
  Samuel W. Banning.